O. DORSEY.
Harvester Rake.
No. 2,982. Reissued June 9, 1868.
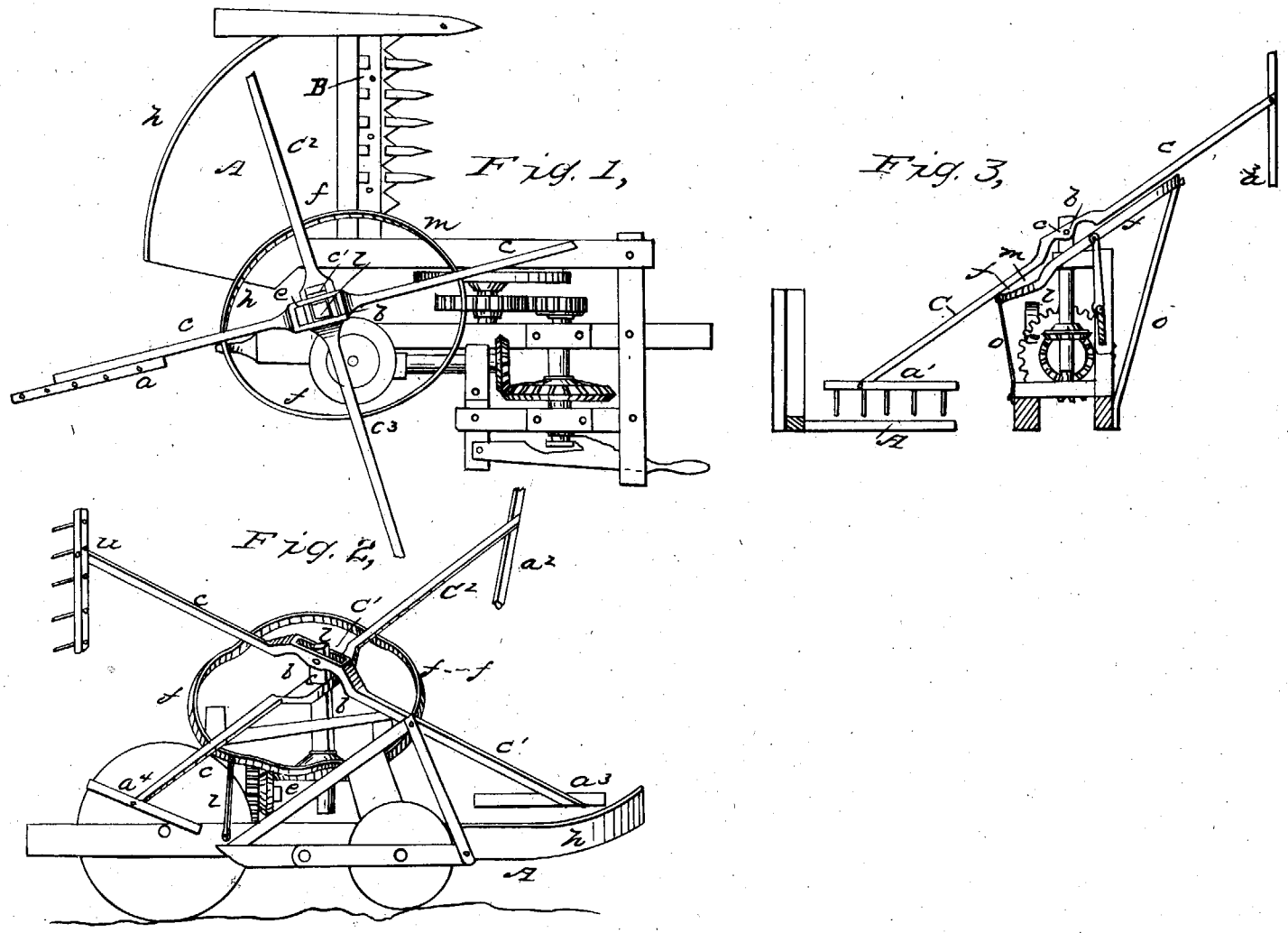
Witnesses:
Geo. T. Buckley
W. A. McFarlan
Inventor:
George Harding
atty. for O. Dorsey
N. PETERS, Photo-Lithographer, Washington, D. C.

UNITED STATES PATENT OFFICE.

OWEN DORSEY, OF NEWARK, OHIO.

IMPROVEMENT IN HARVESTER-RAKES.

Specification forming part of Letters Patent No. 14,350, dated March 4, 1856; reissue No. 1,067, dated October 23, 1860; reissue No. 2,982, dated June 9, 1868.

*To all whom it may concern:*

Be it known that I, OWEN DORSEY, late of Dorseyville, Maryland, now of Newark, Ohio, did invent a new and Improved Raking Device for Harvesters; and that the following is a full, clear, and exact description of the same, reference being had to the annexed drawings, making a part of this specification, in which—

Figure 1 is a top view of a harvester with said invention applied to it. Fig. 2 is a side elevation of the same; Fig. 3, an end elevation of the same.

Similar letters of reference indicate corresponding parts in the several figures.

This invention consists in the use of a continuously-revolving gathering and discharging rake in connection with a horizontal platform, over which the discharging-rake moves in the arc of a circle in such a manner that the rake descends into the standing grain in front of the cutter, gathers the grain, and then moves back over the platform, sweeping the cut grain in the arc of a circle, and discharging it in the rear of the horses, and rising, after accomplishing this work, so as to pass in an elevated position, out of the way of the frame and driving-wheel, and down into the standing grain in front of the cutter, so as to gather the grain to the cutter for a succeeding gavel. In connection with said continuously revolving gathering and discharging rake, there are used three or more continuously-revolving gathering heads or beaters, which merely press or gather the standing grain into the cutters, but do not discharge it off the platform.

To enable others skilled in the art to make and use my invention, I will proceed to describe its construction and mode of operation.

A is the platform of a harvester; B, the finger-bar, which is furnished with slotted fingers and an ordinary straight vibrating cutter or sickle. $a^1$ is a toothed rake-head corresponding in length with the width of the platform. This rake-head $a^1$ is attached to the end of an arm, $c$ $c^1$, which arm is pivoted at $b$ to a central revolving shaft, $i$. $f$ $f$ is a camway attached to the frame by rods or supports. The relative arrangement of these several parts to each other is such that as the shaft $i$ is revolved the arm $c$ $c^1$ follows the camway $f$ $f$, and causes the rake-head $a'$ to strike into the standing grain in front of the cutter, and thus separates that grain which is to form the next gavel, presses it against the cutter, and, when cut, onto the platform A, and then sweeps across the platform in the arc of a circle, carrying the cut grain in front of it and discharging it onto the ground, forming a side delivery at the rear of the drive-wheel. The camway $f$ $f$ causes the arm to carry down the rake as it approaches the front of the cutter, and then pass horizontally across the platform in the arc of a circle, and then rise and pass out of the way of the rest of the machine to the front of the cutter, where it descends into the standing grain, as before. $h$ is a fender-board raised on the outer edge of the platform, and is shaped so as to conform nearly to the path described by the outer extremity of the revolving rake $a^1$, for the purpose of preventing the grain from flying out from the revolving rake, and thus co-operates with the revolving rake to form the gavel. A friction-roller may be attached to the arm which carries the rake-head where the arm comes in contact with the camway $f$ $f$, in order to facilitate the passage of the arm along the camway. The shaft $i$ is rotated by a gear-wheel, $e$, from the master-wheel.

It will thus be seen that the rake $a^1$ is both a gathering-rake and a discharging sweep-rake, and possesses the advantage of making the separation of the portion of grain which is to form the next gavel in the standing grain instead of in the cut grain on the platform, whereby the draggling of grain is prevented, and at the same time of discharging the grain so separated in the arc of a circle at the side of the machine, as above described, which no previous raking device has done.

In order to gather the grain properly, however, it is necessary to have intermediate revolving gathering-heads $a^2$ $a^3$ $a^4$, (usually three in number,) which strike into the grain and merely gather it onto the cutters and platform, as is done by the beaters of the ordinary reel, and do not discharge it at all. These heads are attached to arms $c^1$ $c^2$ $c^3$, and they are so arranged, in reference to the revolving rake-head $a^1$, that the three beaters $c^1$ $c^2$ $c^3$ precede the rake-head in revolving, and it performs the gathering function of a fourth beater, and then superadds thereto the discharging sweep-rake function above described.

Experience has shown that in the majority of cases four gathering-beaters should press the grain to the cutter and platform for every passage of a discharging-rake across the platform.

Having thus described the said invention, what is claimed, is—

1. A continuously-revolving rake, attached by a pivotal connection to the shaft on which it revolves, so as to allow it to describe the proper path to gather or discharge the grain and to clear the frame.

2. The combination of a platform, a vibrating cutter, and a continuously-revolving gathering and discharging rake, so arranged as to enter the uncut grain in front of the cutter, and to discharge the cut grain in the arc of a circle.

3. A continuously-revolving gathering and discharging rake, which enters the uncut grain in front of the cutter and discharges the cut grain in the arc of a circle, in combination with one or more intermediate revolving gathering heads or beaters.

4. The combination of a continuously-revolving gathering and discharging rake, which discharges the grain in the arc of a circle, and the camway or guide for regulating the course of the rake.

5. The combination of a continuously-revolving rake, which discharges the grain in the arc of a circle, with a platform having a fender, conformed substantially to the path described by the outer end of the revolving rake in passing over the same, substantially as described.

6. The combination of a continuously-revolving gathering and discharging rake, which discharges the grain in the arc of a circle, with a vibrating-cutter.

7. The combination of a continuously-revolving gathering and discharging rake, a camway or guide, and friction-rollers attached to the arms of said revolving rake.

OWEN DORSEY.

Witnesses:
JAS. T. JACKSON,
M. M. RUSSELL.